(12) United States Patent
Lindgren

(10) Patent No.: US 10,808,739 B2
(45) Date of Patent: Oct. 20, 2020

(54) FLOW BALANCER

(71) Applicant: Peter B. Lindgren, Pompano Beach, FL (US)

(72) Inventor: Peter B. Lindgren, Pompano Beach, FL (US)

(*) Notice: Subject to any disclaimer, the term of this patent is extended or adjusted under 35 U.S.C. 154(b) by 0 days.

(21) Appl. No.: 16/555,706

(22) Filed: Aug. 29, 2019

(65) Prior Publication Data

US 2020/0072256 A1  Mar. 5, 2020

Related U.S. Application Data

(60) Provisional application No. 62/725,344, filed on Aug. 31, 2018.

(51) Int. Cl.
*F15D 1/00* (2006.01)

(52) U.S. Cl.
CPC ............. *F15D 1/004* (2013.01); *F15D 1/001* (2013.01)

(58) Field of Classification Search
CPC .................................. F15D 1/04; F15D 1/08
USPC .................................. 138/39, 37, 42; 251/118
See application file for complete search history.

(56) References Cited

U.S. PATENT DOCUMENTS

| | | | | |
|---|---|---|---|---|
| 3,185,181 A * | 5/1965 | Demyan | ................ | F04D 29/667 138/37 |
| 3,523,557 A * | 8/1970 | Colter | ..................... | F16L 55/04 138/37 |
| 3,636,983 A * | 1/1972 | Keyser | ....................... | F15D 1/02 138/39 |
| 4,080,997 A * | 3/1978 | Biornstad | ................. | D21F 1/06 138/37 |
| 4,821,768 A * | 4/1989 | Lett | ........................... | F15D 1/04 137/551 |
| 5,937,908 A * | 8/1999 | Inoshiri | ..................... | F15D 1/02 138/37 |
| 6,854,341 B2 * | 2/2005 | Oddie | ....................... | G01F 1/34 73/861.52 |
| 6,997,214 B2 * | 2/2006 | Kuo | ........................... | F15D 1/02 138/109 |
| 7,462,016 B2 | 12/2008 | Lindgren | | |
| 7,490,467 B2 * | 2/2009 | Cummings | ............. | F01N 1/088 60/274 |
| 9,067,183 B2 * | 6/2015 | Glanville | .............. | B01F 5/0617 |
| 10,051,843 B2 | 8/2018 | Lindgren | | |
| 10,302,104 B2 * | 5/2019 | Schmidt | .................... | F15D 1/04 |
| 2018/0153142 A1 | 6/2018 | Hansen | | |
| 2018/0160657 A1 | 6/2018 | Lindgren | | |
| 2018/0206458 A1 | 7/2018 | Lindgren | | |

FOREIGN PATENT DOCUMENTS

NO         20093398         5/2011

\* cited by examiner

*Primary Examiner* — Patrick F Brinson
(74) *Attorney, Agent, or Firm* — McHale & Slavin, P.A.

(57) ABSTRACT

A flow balancer to reduce turbulence and achieve a laminar water flow system for fish while being pumped. The flow balancer having a tubular guide for the fish made from spaced apart blades having a width greater than a thickness of the spaced blades forming the tubular guide. The tubular guide is constructed and arranged to prevent turbulent and non-parallel water flow and allow fish to pass in a laminar water flow.

7 Claims, 3 Drawing Sheets

FLOW BALANCER

CROSS REFERENCE TO RELATED APPLICATIONS

Not Applicable

FEDERALLY SPONSORED RESEARCH OR DEVELOPMENT

Not Applicable

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/725,344, entitled "FLOW BALANCER", filed Aug. 31, 2018 the contents of which is incorporated herein by reference.

FIELD OF THE INVENTION

This invention relates to the fish farming industry and, more particularly, to a fish pump flow balancer system constructed and arranged to remove sea lice from salmon.

BACKGROUND OF THE INVENTION

Many species of fish are farmed offshore in large net pens. One of the most popular is salmon. Unfortunately there is a major problem today with infestation of sea lice on farmed salmon which may also become a problem with other farmed fish in the future. With the salmon industry growing rapidly, the proximity and cross contamination makes management of sea lice on salmon challenging.

Sea lice are marine copepods of the family Caligidae with several each of the species Lepidopteries and Caligus species. They are a naturally occurring parasite that has existed on wild fish well before salmon farming efforts, although there is speculation that farming efforts have increased the spread of sea lice. Sea lice on fish are not a threat to humans, but they leave marks on fish that lower market value and increase likelihood of fish disease. Further, environmentalists claim that sea lice cause mortalities on salmon fingerlings returning to the ocean from rivers and therefore fewer fingerling survivors, and fewer mature adult spawning river returns.

Treatment for sea lice infestations can take many forms in a farm environment. Several chemical treatments are currently available, the most prevalent being SLICE (Emamectin benzoate EMB). SLICE can be presented to fish through inclusion in feed. Each application technique has drawbacks. Application techniques are difficult to control effective dosage rates and there is no mechanism to prevent excess chemical from entering the environment. Sea lice have also shown resistance to Slice and other chemicals treatments after repeated use.

Other treatments involve bathing salmon in a solution of hydrogen peroxide. Hydrogen peroxide is not harmful to the environment so it can be pumped back into the ocean. However, removing a high percentage of lice with hydrogen peroxide is very expensive and requires good control and high capital cost in the form specialized equipment.

Hot water treatment is another way to remove and kill sea lice. Heating massive amount of water, recovering and filtering has high capital expense and systems must be cleaned if transported to another site to prevent transfer of disease. Besides being high in cost to operate equipment, using hot water requires a temperature that is stressful on the fish wherein fish do not eat after processing causing fish growth losses.

SUMMARY OF THE INVENTION

A flow balancer apparatus to reduce turbulence and achieve a laminar water flow system for use with pumping of fish. The device employs an inner guide for the fish. The inner guide is formed from bars spaced apart having a width greater than a thickness of the bars forming an inner tubular guide allowing the fish to travel from an inlet to an outlet enveloped by a tube larger in diameter than the diameter of the guiding tube formed outer diameter.

An objective of the invention is to disclose a flow balancer which is effective in sea lice removal with minimal fish damage.

Still another feature of the invention is to disclose a flow balancer device that inhibits fish damage typically caused by fish contacting internal tubes, pipes and pump surfaces or being subjected to excessive turbulence.

Yet objective of the invention it to provide a device that allows water pressure and flow to balance, wherein water exiting from an outer cavity of the device joins an interior flow of water to center a fish within tubing and before the fish enters a pump.

Still another objective of the invention is to provide a device to minimize fish contacting of internal tubes, pipes and pump surfaces, and reduction of excessive turbulence.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
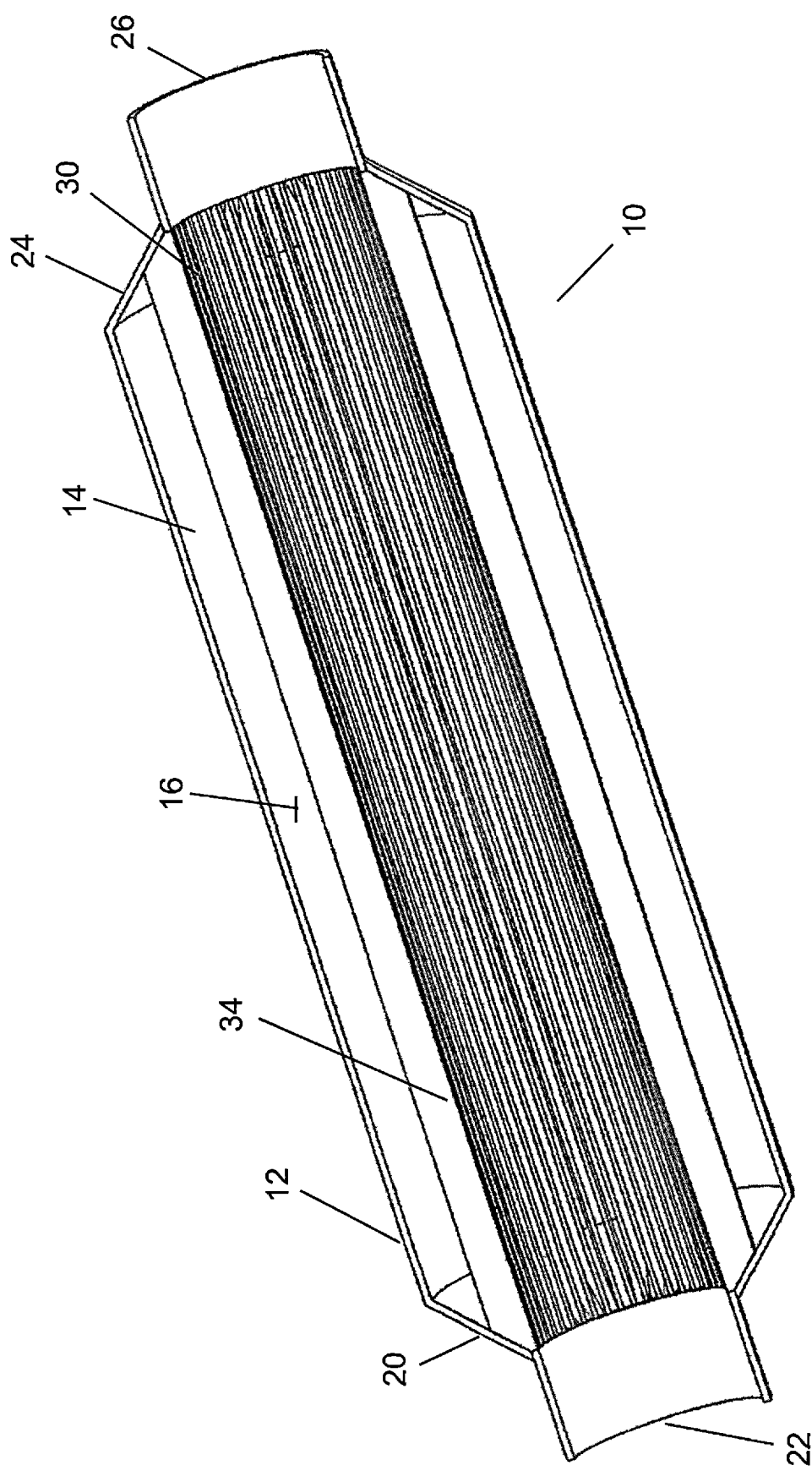
FIG. 1 is a cross sectional side view of a flow balancer.

While the present invention can be constructed of various forms, shown in the drawings and hereinafter described is a preferred, albeit not limiting, embodiment with the understanding that the present disclosure is to be considered an exemplification of the present invention and is not intended to limit the invention to the specific embodiments illustrated.

Earlier inventions by the Applicant include U.S. Pat. No. 7,462,016 which discloses a fish friendly pump with flutes or orifice shape serrations that improve performance of larger Coandas effect pumps. Applicant's U.S. Pat. No. 10,051,843 discloses an entrance cone that allows fish to swim into a pump facing forward which is less stress on the fish and has been found to improve sea lice removal. Applicant's U.S. patent Ser. No. 15/934,252 discloses a device that configures two Coandas effect pumps in series to provide directional positioning of fish. Using such devices improved sea lice removal from earlier techniques from 40-70 percent, and in some instances over 90 percent. Remaining opportunities include further sea lice removal efficiency and a reduction in fish damage.

Applicant's instant invention sets forth a flow balancer device that is also capable of improving sea lice removal while minimizing fish damage. Recognizing that fish damage is commonly caused by fish contacting the internal tubes, pipes and pump surfaces and excessive turbulence, the instant invention addresses each of these issues.

It is understood that water in tubular pipes tends to spin or rotate. Tubular pipes are commonly used to transfer fish from cages to boats, or cages to barges for delousing. The transfer of fish through pipes is caused by a fish pump capable of lifting the fish from one area to another. The differential inner and outer radius within pipes causes velocity gradients within the pipe leading to a disruption of water and fish flow. A problem, to which this invention addresses, is that fish not centered in a pipe prior to entering a fish pump will likely result in some injury during passage through the fish pump. Further, a high water flow rate can result in turbulence which can further harm the fish.

Figure 2:
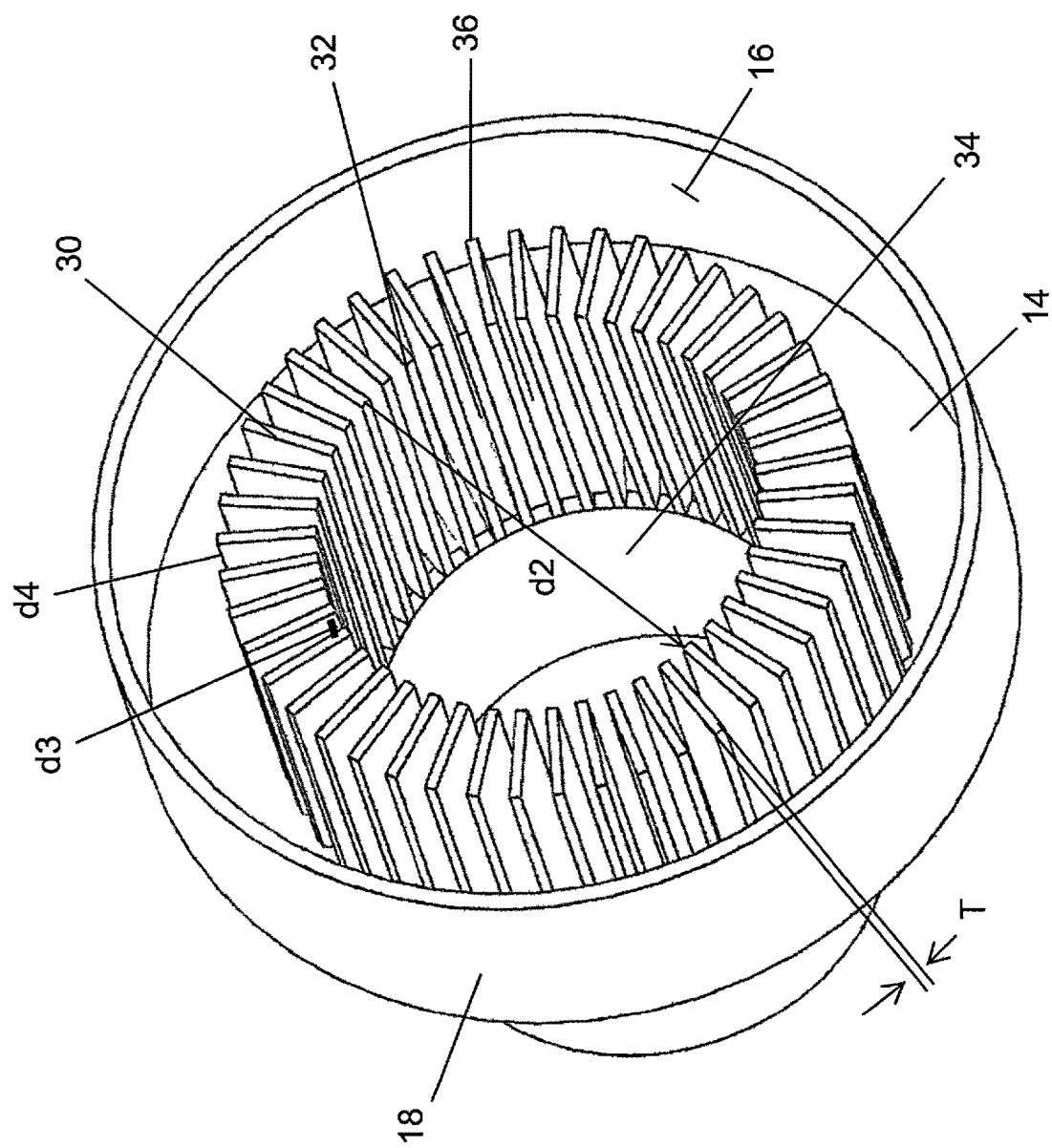
FIG. 2 is a cross sectional cut away view of the flow balancer.

Referring to FIGS. 1 and 2, the flow balancer is formed from a tubular shaped housing 10 having an outer tube 12 defining an interior chamber 14 of a first diameter $d_1$. In one embodiment the outer tube 12 is further defined by an inner surface 16 and an outer surface 18 with a first conical shaped endwall 20 coupled to an inlet 22 and a second conical shaped endwall 24 coupled to an outlet 26.

A plurality of spaced apart blades 30 extend between the inlet 22 and the outlet 26. Each blade 30 having an inner edge 32 disposed in a circular pattern forming an inner tubular guide 34, an outer edge 36 of each blade 30 extending a distance into the interior chamber 14. The interior chamber forming the space between the outer edge 26 and the inner surface 16 of the outer tube 12. The blades 30 that form the tubular guide 34 are constructed and arranged to prevent turbulent and non-parallel water flow and creates a laminar water flow for ease of fish passage.

The energy loss from turbulence is directly related to the square of the velocity. Water speeds in a delousing system range from 3 to 12 meters per second. The energy disruption of non-laminar flow to a turbulent flow can result in the removal of fish scales, can cause gill bleeding and other damage to the fish. The speed differential and turbulence can be seen with FEA analysis using very fine elements. Efficient damage free delousing requires laminar and symmetrical flow with the fish centered in the pipe prior to entering a pump that has the ability to delouse a fish. The turbulent energy must be dissipated, and viscous drag can be used to slow the water flow and dissipate undesirable energy and turbulence created in the pipes or tubes. The flow balancer of the instant invention uses viscous drag to capture higher pressure and turbulence by positioning the blades 30 positioned parallel to the water flow forming an inner tubular guide 34 to center the fish. The high energy swirl and velocity imbalance are captured by the blades 30 and allowed to dissipate and balance in the interior chamber 14 formed between an outer blade edge 36 and the inner surface 16 of the outer tube 12. The interior chamber 14 has a diameter $d_2$ measured between the inner edge 32 of diametrically opposing blades 30. The spacing between the blades having a diameter $d_3$ along the inner edge 32 and a diameter $d_4$ along the outer edge 36. The thickness $t_1$ of the blade 30 is between 0.25" and 0.375".

The instant device allows water pressure and water flow balance by passing partial flow through the blades 30 before the water flow exits the assembly. The water flow exiting from the interior chamber 14 joins an interior flow of water passing the inlet 22 and outlet 26 through the interior chamber 14 of the housing 10 and centers the fish in the laminar flow. The housing 10 is placed before fish pump. FEA models in a suction system traveling approximately 3.25 meters per second in a 10" tube. Guide blades of 0.250" thick and 2" wide spaced 0.25" apart showed very little improvement in FEA models. In the preferred embodiment, each blade 30 is about 0.375" thickness and 2" width spaced 0.375" apart for reduced velocity differentials from 2.3 meters per second to 1 meter per second. Alternatively, each blade 30 can be about 0.25" thick and 2" width spaced apart about 0.44" for a dropped velocity variation of about 0.2 meters per second with symmetrical flow. The blade 30 can be formed to a smaller diameter at the outlet 26 allowing fish fins that may enter between the blades 30 to pass without damage. The outer tube 12 diameter is large enough to allow water flow around an interior chamber 14 formed between the outer edges 36 of the blades 30 and the inner surface 16 of the outer tube 12. Each blade has a width defined as the distance between the inner edge 32 and the outer edge 36, in the preferred embodiment the blade thickness T is smaller than the blade width. The width of each blade 30 is at least twice the blade thickness T. In one embodiment the outlet 26 has a diameter greater than the inlet 22. Further the outlet has a diameter greater than the inner tubular guide diameter. The outer edge 36 of each blade 30 is spaced apart from an inner surface 16 of the outer tube 12 forming diameter d4 of a predetermined size that fits within the chamber 14 having diameter $d_1$.

The present invention is also useful for dewatering. Suction water is usually in the range of 3-5 meters per second entering the pump and current flow balance device. The pump discharge water with fish can be from 9-12 meters per second. Water flow will be approximately 3000 gallons per minute suction and 6000+gallons output. The water must be separated from the fish to filter out the sea lice and eggs. Dewatering fish with lower parallel spaced bars at high speed causes tumbling and fish damage. With use of the present invention including a set of blades or bars to form a fish guiding tube with a water outlet 26 above or around the formed tube of blades 34 allows water to escape evenly around the central area without fish damage, and slows the fish sufficiently for conventional lower parallel bar dewatering without damage. The height of the discharge tube can be adjusted up or down to control the total vertical head for the pump to maximize the system efficiency.

Figure 3:
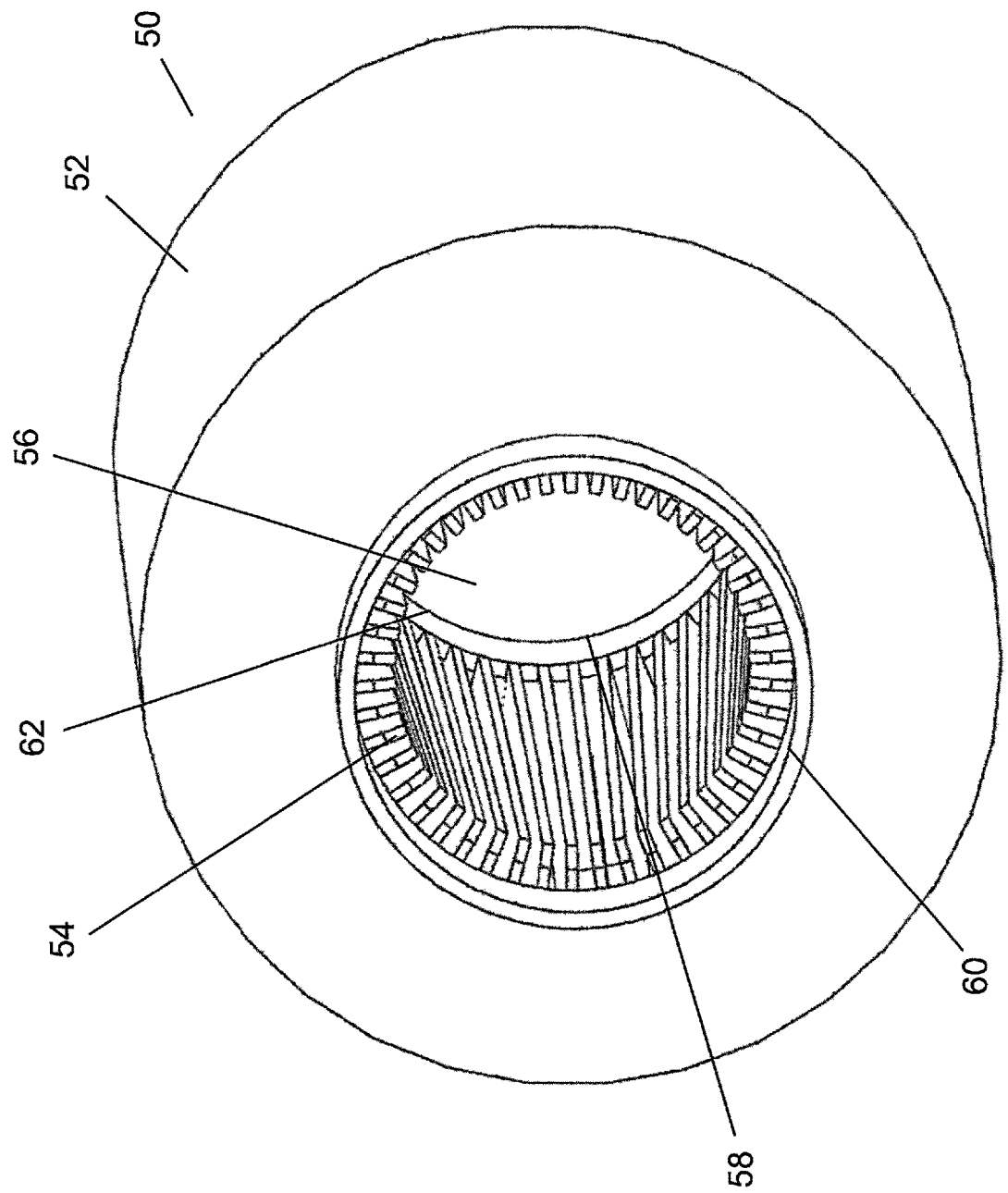
FIG. 3 is a sectional view of a flow balancer.

Referring to FIG. 3 illustrated is a flow balancer designed to reduce turbulence and achieve a laminar water flow system fish to prevent damage to fish while being pumped. The outer tube 52 is large enough to allow water flow around an interior chamber between an inner surface of the outer tube and an outer edge of the blades 54. The blades 54 forming an inner tubular guide 56, the blades each having a width that is more than twice the thickness T. The blades 54 form a smaller final opening 58 than the entrance 22. The outer diameter of the water outlet 62 larger than the formed tubular guide 56 of the spaced apart blades 54.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically. The term "about" means, in general, the stated value plus or minus 5%. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an element of a device that "comprises," "has," "includes" or "contains" one or more features, possesses those one or more features, but is not limited to possessing only those one or more features.

What is claimed is:

1. A flow balancer comprising:
    a tubular shaped housing having an outer tube formed from a continuous sidewall having an inner surface and an outer surface defining an inlet and an outlet;
    a plurality of spaced apart blades extending between said inlet and said outlet, each said blade defined by an inner edge forming an inner tubular guide between said inlet and said outlet and positioned not to protrude into a flow path formed between said inlet and said outlet, and an outer edge of each said blade spaced apart from said inner surface of said outer tube a predetermined distance forming a chamber therebetween;
    wherein said tubular guide allows fish to pass through said flow path in a laminar water flow and said chamber allows fluid flow between said inner surface of said outer tube and an outer edge of each said blade to annul turbulent fluid.

2. The flow balancer according to claim 1 including a first conical shaped endwall coupled to said inlet and a second conical shaped endwall coupled to said outlet.

3. The flow balancer according to claim 2 wherein said outer tube includes a diameter large enough to allow fluid to flow uninhibited in said chamber between said outer edges of said blades and said inner surface of said outer tube, and between said first and second conical shaped endwalls.

4. The flow balancer according to claim 1 wherein each said blade has a width defined as the distance between said inner edge and said outer edge, and a blade thickness smaller than said blade width.

5. The flow balancer according to claim 4 wherein said width of each blade is at least twice said blade thickness.

6. The flow balancer according to claim 1 wherein each said blade is about 0.375" thickness and 2" width spaced 0.375" for reduced velocity differentials from 2.3 meters per second to 1 meter per second.

7. The flow balancer according to claim 1 wherein each said blade is about 0.25" thickness and 2" width spaced 0.44" for a dropped velocity variation of about 0.2 meters per second with symmetrical flow.

* * * * *